(12) United States Patent
Moriarity et al.

(10) Patent No.: US 6,417,292 B1
(45) Date of Patent: Jul. 9, 2002

(54) ELECTRODEPOSITABLE COATING COMPOSITIONS INCLUDING UNGELLED REACTION PRODUCTS OF EPOXY FUNCTIONAL POLYESTERS AND AMINES COATED SUBSTRATES AND METHODS OF ELECTROCOATING USING THE SAME

(75) Inventors: Thomas C. Moriarity; Venkatachalam Eswarakrishnan; Keith S. Ritter, all of Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/545,059

(22) Filed: Apr. 7, 2000

(51) Int. Cl.$^7$ .................. C09D 163/00; C09D 167/02
(52) U.S. Cl. .................. 525/440; 525/437; 525/438; 525/443; 528/288; 528/297; 204/499; 204/504; 204/505
(58) Field of Search .................. 525/437, 440, 525/443, 438; 204/499, 505, 504

(56) References Cited

U.S. PATENT DOCUMENTS

| | | | |
|---|---|---|---|
| 3,236,895 A | 2/1966 | Lee et al. .................. 260/584 |
| 3,455,806 A | 7/1969 | Spoor et al. .................. 204/181 |
| 3,719,626 A | 3/1973 | May .................. 260/29.2 EP |
| 3,928,157 A | 12/1975 | Suematsu et al. .................. 204/181 |
| 4,104,147 A | 8/1978 | Marchetti et al. .................. 204/181 C |
| 4,148,772 A | 4/1979 | Marchetti et al. .................. 260/29.3 |
| 4,302,373 A | 11/1981 | Steinmetz .................. 260/29.3 |
| 4,420,574 A | 12/1983 | Moriarity et al. .................. 523/404 |
| 4,423,166 A | 12/1983 | Moriarity et al. .................. 523/414 |
| 4,432,850 A | 2/1984 | Moriarity et al. .................. 204/181 C |
| 4,480,058 A | 10/1984 | Ting et al. .................. 523/404 |
| 4,536,558 A | 8/1985 | Kordomenos .................. 528/100 |
| 4,579,932 A | 4/1986 | Paar et al. .................. 528/114 |
| 5,096,556 A | 3/1992 | Corrigan et al. .................. 204/181.7 |
| 5,308,412 A | 5/1994 | Ott et al. .................. 204/181.7 |
| 5,739,213 A | 4/1998 | Freriks et al. .................. 525/438 |
| 5,789,468 A * | 8/1998 | Chung .................. 523/417 |
| 5,811,198 A | 9/1998 | Freriks et al. .................. 428/482 |
| 5,820,987 A | 10/1998 | Kaufman et al. .................. 428/413 |

FOREIGN PATENT DOCUMENTS

| | | |
|---|---|---|
| EP | 0 595 356 A2 | 5/1994 |
| EP | 0 722 964 A1 | 7/1996 |
| JP | 09235354 | 9/1997 |

* cited by examiner

Primary Examiner—Patricia A. Short
(74) Attorney, Agent, or Firm—Deborah M. Altman

(57) ABSTRACT

The present invention is directed to electrodepositable coating compositions providing improved film flexibility and humidity resistance. The compositions contain a substantially ungelled resin or reaction product formed from reacting (i) an epoxy functional polyester with (ii) an amine. The present invention also includes a method for electrocoating a conductive substrate with the described electrodepositable coating compositions. Additionally, the present invention is directed to a conductive substrate coated according to the described method.

20 Claims, No Drawings

ELECTRODEPOSITABLE COATING COMPOSITIONS INCLUDING UNGELLED REACTION PRODUCTS OF EPOXY FUNCTIONAL POLYESTERS AND AMINES COATED SUBSTRATES AND METHODS OF ELECTROCOATING USING THE SAME

CROSS-REFERENCE TO RELATED APPLICATION

This application relates to U.S. patent application Ser. No. 09/531,807, pending, entitled "Cationic Aliphatic Polyester Resins And Their Use In Electrodeposition", by Raphael O. Kollah, et al., filed Mar. 21, 2000 and U.S. application Ser. No. 09/545,060, pending, entitled "Electrodepositable Coating Compositions Including Gelled Reaction Products of Epoxy Functional Polyesters and Amines, Coated Substrates and Methods of Electrocoating Using the Same", by Thomas Moriarity, et al., filed concurrently herewith and both of which are herein incorporated by reference.

FIELD OF THE INVENTION

The present invention relates generally to electrodepositable coating compositions and, more particularly, to electrodepositable coating compositions providing improved film flexibility and improved humidity and chip resistance.

BACKGROUND OF THE INVENTION

Electrodepositable coatings have become the coatings of choice for corrosion protection for metal substrates, such as those used in the automobile industry. Electrodeposition processes provide higher paint utilization, outstanding corrosion protection, low environmental contamination, and a highly automated process compared to conventional non-electrophoretic coating methods.

The electrodeposition process involves immersing an electroconductive substrate into a bath of an aqueous electrocoating composition, the substrate serving as a charged electrode in an electrical circuit comprising the electrode and an oppositely charged counter-electrode. Sufficient electrical current is applied between the electrodes to deposit a substantially continuous, adherent film of the electrocoating composition onto the surface of the electroconductive substrate.

U.S. Pat. Nos. 4,148,772 and 4,104,147 disclose electrocoating compositions including polyepoxides chain extended with polyester polyols. Reaction occurs by the alcoholic primary hydroxyl of the polyester polyol opening the epoxide ring forming an ether linkage and a secondary hydroxyl group (U.S. Pat. No. 4,148,772 at column 3, lines 33–35). The chain extended polyepoxides are reacted with a secondary amine and made dispersible in water with acid.

U.S. Pat. No. 4,536,558 discloses electrodepositable resins which are prepared by reacting polyepoxides with polycarboxylic acids to produce chain extended polyepoxides. The chain extended polyepoxides are then reacted with secondary amines or, optionally, with blends of secondary amines with minor amounts of primary amines, care being taken to avoid gelation.

An object of the present invention is to provide a composition and process for the production of coatings with improved chip and blister resistance and humidity resistance while additionally providing efficiencies in application and processing, such as higher paint utilization, low environmental contamination, and a highly automated process.

SUMMARY OF THE INVENTION

The present invention provides a curable coating composition which comprises a curing agent and a substantially ungelled reaction product prepared from reactants comprising: (a) an epoxy functional polyester; and (b) a polyoxyalkylene polyamine.

Another aspect of the present invention is a curable coating composition comprising a substantially ungelled ionic reaction product prepared from reactants comprising: (a) an epoxy functional polyester prepared from reactants comprising: (1) the reaction product of a polyol and a polycarboxylic acid or anhydrides thereof; and (2) an epoxy functional material; and (b) an amine-functional material.

A curable coating composition is provided which comprises a substantially ungelled ionic reaction product prepared from reactants comprising an epoxy functional polyester and a primary amine, wherein the reactants are essentially free of secondary amines.

A coated substrate of the invention has on at least a portion of a surface thereof a coating deposited from a coating composition which comprises: (A) a curable, substantially ungelled reaction product prepared from reactants comprising (i) an epoxy functional polyester; and (ii) a polyoxyalkylene polyamine; and (B) a curing agent.

Another coated substrate of the present invention has on at least a portion of a surface thereof a coating deposited from a coating composition which comprises: (A) a substantially ungelled ionic reaction product prepared from reactants comprising: (i) an epoxy functional polyester prepared from reactants comprising: (1) the reaction product of a polyol and a polycarboxylic acid or anhydrides thereof; and (2) an epoxy functional material; and (ii) an amine-functional material; and (B) a curing agent.

Another aspect of the present invention is a coated substrate having on at least a portion of a surface thereof a coating deposited from a coating composition which comprises a substantially ungelled ionic reaction product prepared from reactants comprising an epoxy functional polyester and a primary amine, wherein the reactants are essentially free of secondary amines.

A method of electrocoating an electrically conductive surface of the present invention comprises passing electric current between an anode and a cathode to cause an electrodepositable coating composition to deposit upon the electrically conductive surface, wherein the coating composition comprises a substantially ungelled reaction product prepared from reactants comprising: (i) an epoxy functional polyester; and (ii) a polyoxyalkylene polyamine.

Another method of electrocoating an electrically conductive surface according to the present invention comprises passing electric current between an anode and a cathode to cause an electrodepositable coating composition to deposit upon the electrically conductive surface, wherein the coating composition comprises a substantially ungelled reaction product prepared from reactants comprising: (i) an epoxy functional polyester prepared from reactants comprising (1) the reaction product of a polyol and a polycarboxylic acid or anhydrides thereof, and (2) an epoxy functional material; and (ii) an amine-functional material.

Yet another method of electrocoating an electrically conductive surface according to the present invention comprises passing electric current between an anode and a cathode to cause an electrodepositable coating composition to deposit upon the electrically conductive surface, wherein the coating composition comprises a substantially ungelled reaction product prepared from reactants comprising an epoxy functional polyester and a primary amine, and wherein the reactants are essentially free of secondary amines.

Yet another method of electrocoating an electrically conductive surface according to the present invention comprises passing electric current between an anode and a cathode, and sequentially depositing first and second electrodepositable coating compositions to form a first coating and a second coating on the electrically conductive surface, wherein the first coating composition comprises an electrically conductive material, and wherein the second coating composition comprises a substantially ungelled reaction product prepared from reactants comprising: (i) an epoxy functional polyester; and (ii) a polyoxyalkylene polyamine.

A still further method of coating a substrate comprises providing a substrate and applying a coating composition upon at least a portion of the substrate, the coating composition comprising a substantially ungelled reaction product prepared from reactants comprising an epoxy functional polyester and a polyoxyalkylene polyamine.

DESCRIPTION OF THE PREFERRED EMBODIMENTS

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers. Additionally, any numeric reference to amounts, unless otherwise specified, are "by weight"; for instance, the phrase "solids of 34%" means "solids of 34% by weight".

The curable coating compositions of the invention comprise one or more substantially ungelled reaction products or additives. The substantially ungelled, e.g, ionic, reaction products of the invention are prepared by reacting one or more epoxy functional polyesters with one or more amine functional materials. The reaction products may be used alone or in combination with another resin and/or other additives to provide curable electrodepositable coating compositions of the present invention. In the following discussion, the coating compositions of the invention are discussed in the context of electrodepositable coating compositions. However, it is to be understood that the coating compositions of the invention are not limited to electrodepositable coatings but can also be used in other coating processes, such as spray coating processes for primers, basecoats, clearcoats or refinish coating compositions.

By "ungelled" or "non-gelled" is meant the reaction products are substantially free of crosslinking and have an intrinsic viscosity when dissolved in a suitable solvent. The intrinsic viscosity of the reaction product is an indication of its molecular weight. For a discussion of intrinsic viscosity, see P. Hiemenz, *Polymer Chemistry*, p. 590–610, 1$^{st}$ edition (1984), herein incorporated by reference. A gelled reaction product, on the other hand, since it is of essentially infinitely high molecular weight, will have an intrinsic viscosity too high to measure.

Epoxy functional polyesters suitable for use in the curable electrodepositable coating composition of the present invention can be prepared by reacting (1) the reaction product of one or more polyols and one or more polycarboxylic acids or anhydrides thereof, and (2) one or more epoxy functional materials.

Examples of suitable polyols useful for forming the polyester or reaction product (1) include resorcinol, dihydroxy benzene, aliphatic, cycloaliphatic or aralaphatic hydroxyl containing compounds, such as ethylene glycol, propylene glycol, hydrogenated bisphenol A, dihydroxyl cyclohexane, dimethylol cyclohexane, or combinations thereof. In a preferred embodiment, the polyol is saturated or hydrogenated bisphenol A. The polyol is present in an amount of about 10 weight percent to about 70 weight percent, preferably about 20 to about 50 weight percent, of the reactants to form the reaction product (1).

Examples of suitable polycarboxylic acids and anhydrides thereof useful for forming reaction product (1) for the practice of the invention include aromatic or aliphatic polycarboxylic acids, such as succinic acid, adipic acid, azelaic acid, sebacic acid, maleic acid, fumaric acid, phthalic acid, tetrahydrophthalic acid, hexahydrophthalic acid, trimellitic acid, and cyclohexane dicarboxylic acid, and anhydrides thereof. In a preferred embodiment, the anhydride of the polycarboxylic acid is methyl hexahydrophthalic anhydride. The acid or anhydride comprises about 30 weight percent to about 90 weight percent, preferably about 50 weight percent to about 80 weight percent, of the reactants. The polyol and acid or anhydride can be reacted with or without a catalyst in any conventional manner known in the art to form the polyester reaction product (1).

The polyester reaction product (1) is reacted with one or more epoxy functional materials. Suitable epoxy-functional materials for the practice of the invention preferably contain at least one epoxy or oxirane group in the molecule, such as di- or polyglycidyl ethers of polyhydric alcohols. Preferably, the epoxy-functional material contains one epoxy group per molecule. Preferred epoxy functional materials are epihalohydrins, such as epichlorohydrin.

Other useful epoxy functional materials include, for example, polyglycidyl ethers of polyhydric alcohols which can be formed by reacting epihalohydrins, such as epichlorohydrin, with polyhydric alcohols, such as dihydric alcohols, in the presence of an alkali condensation and dehydrohalogenation catalyst such as sodium hydroxide or potassium hydroxide. Suitable polyhydric alcohols can be aromatic, aliphatic or cycloaliphatic. An example of a useful saturated polyglycidyl ether of polyhydric alcohol is commercially available as EPONEX 1510 from Shell Chemical Company of Houston, Tex.

Suitable epoxy-functional materials preferably have an epoxy equivalent weight ranging from about 90 to about 2000, as measured by titration with perchloric acid using methyl violet as an indicator. About 5 weight percent to about 70 weight percent and preferably about 10 to about 25 weight percent of the epoxy functional material is combined or reacted with the polyester described above to form the reaction product of the invention.

Preferably, the epoxy functional polyester is free or essentially free of hydroxy functionality. The term "essentially free" of hydroxy functionality means that the epoxy functional polyester contains less than about 10% hydroxy functionality, preferably less than about 5%, and most preferably is free of hydroxy functionality.

An example of a suitable epoxy functional polyester of the present invention can be produced by first esterifying saturated or hydrogenated bisphenol-A with about two equivalents of 4-methyl hexahydrophthalic anhydride, and reacting the resulting polyester with about two equivalents of epichlorohydrin. Preferably, this polyester has the following general formula I:

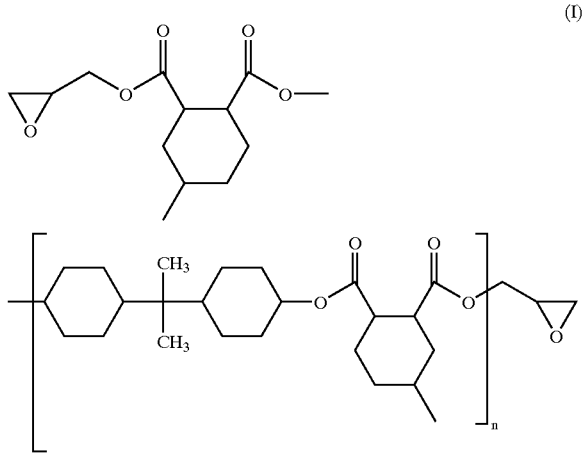

(I)

where n ranges from about 1 to about 15 or, preferably, from about 1 to about 5. As will be appreciated by one of ordinary skill in the art, when preparing the above polyester with a desired n value, some polyesters of different n values can be formed yielding a blended material primarily comprising the desired polyester but also including other similar polyester reaction products.

Another example of a suitable epoxy functional polyester can be prepared by esterification of 2-ethyl-2-butyl-1,3-propane diol with about two equivalents of 4-methyl hexahydrophthalic anhydride, then reacting the resulting polyester with about two equivalents of epichlorohydrin. The alternative epoxy functional polyester comprises a branched aliphatic material having the following general formula II:

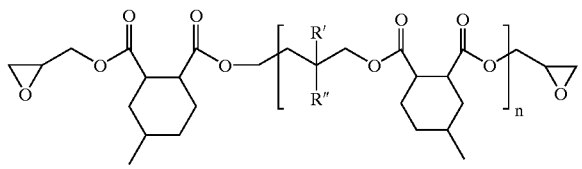

(II)

where n ranges from about 1 to about 15, or, preferably, ranging from about 1 to about 5. R' and R" represent independently selected hydrogen, alkyl groups or aromatic groups. The alkyl groups can be, for example, methyl, ethyl, propyl or butyl groups. Preferably, R' is an ethyl group and R" is a butyl group.

Another example of a suitable epoxy functional polyester can be prepared by reacting saturated bisphenol A with about two equivalents of 4-methyl hexahydrophthalic anhydride and reacting the resulting polyester with a saturated polyglycidyl ether of a polyhydric alcohol, such as EPONEX 1510.

In the practice of the invention, the epoxy functional polyester is reacted with one or more amine functional materials, such as primary, secondary, or tertiary amines, or polymers thereof. Preferred amine functional materials useful in the practice of the invention include primary amines, such as butyl amine or hexyl amine, more preferably diamines, such as ethyl diamine, 1,4-butyl diamine or 1,6-hexyl diamine.

In a preferred practice of the invention, the amine functional material preferably comprises polyoxyalkylene polyamines, such as polyoxymethylene diamine, polyoxyethylene diamine, polyoxypropylene diamine, polyoxybutylene diamine or mixtures thereof.

An example of a preferred polyoxyalkylene polyamine is represented by the following structural formula (III):

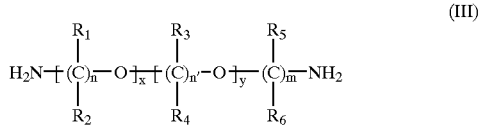

(III)

where m can range from 0 to about 50, n can range from about 1 to about 50, n' can range from about 1 to about 50, x can range from about 1 to about 50, y can range from 0 to about 50 and $R_1$ through $R_6$ can be the same or different and can be independently selected from the group consisting of hydrogen or lower alkyl radicals preferably having about 1 to about 6 carbon atoms.

Another example of a preferred polyoxyalkylene polyamine is represented by the formula:

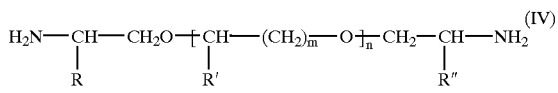

(IV)

where R, R' and R" can be the same or different and are independently selected from the group consisting of hydrogen or lower alkyl radicals preferably having from about 1 to about 6 carbon atoms. The number m preferably ranges from 0 to about 6 and the number n can range from about 1 to about 50, preferably from about 4 to about 40.

Non-limiting examples of preferred polyoxyalkylene amines include Jeffamine® D-2000 and Jeffamine® D-400 which are commercially available from Huntsman. *Huntsman Technical Bulletin for Jeffamine D-2000 Polyoxypropylene Diamine,* 1994, hereby incorporated by reference, describes a preferred polyoxypropylene diamine and gives an average value of 33.1 for n. Particularly preferred is the compound in which R, R' and R" are all methyl radicals. Other useful polyoxyalkylene polyamines are described in more detail in U.S. Pat. No. 3,236,895, column 2, lines 40–73; methods of preparation of the polyoxyalkylene polyamines are illustrated in the patent in Examples 4, 5, 6 and 8–12 in columns 4–9 thereof; the aforementioned portions of U.S. Pat. No. 3,263,895 hereby being incorporated by reference.

It is preferred, for the preparation of a reaction product of the present invention with the desired characteristics, that the amine functional material used in the practice of the invention be essentially free of secondary amines. As used herein, "essentially free of secondary amines" means that the reactants from which the reaction product of the epoxy functional polyester and amine functional material are prepared comprises less than about 10% by weight, preferably less than about 5%, and more preferably is free of secondary amines.

In preparing the reaction products of the invention, the epoxy functional polyester is preferably added to the amine functional material. Usually, the temperature of the reaction ranges from about 50° to about 180° C., preferably from about 90° C. to about 150° C. The reaction time generally ranges from about 1 to about 12 hours and the reaction is preferably allowed to continue until a stable or substantially stable viscosity is attained.

The reaction can be conducted neat or in the presence of solvent. Suitable solvents include hydrocarbons, ethers, alcohols, ether-alcohols and ketones, such as methyl isobutyl ketone. The amount of solvent used can vary from about 0 to about 90 weight percent, preferably about 5 to about 50 weight percent based on total weight of the reaction mixture.

The equivalent ratio of amine groups in the amine functional material (ii) to epoxy groups in the epoxy functional polyester (i) generally can range from about 1.01 to about 2:1, preferably about 1.20 to about 1.70:1 or about 1.20 to about 1.50:1, and most preferably about 1.20:1, to produce reaction products having desirable properties. Equivalent ratios less than about 1.01:1 generally are not preferred because of gelation problems, whereas ratios greater than about 2:1 generally are not preferred because of low molecular weight products and the possibility of undesirable amounts of free amine. For example, an equivalent ratio of (ii) to (i) less than about 1.01:1 may be used if some monofunctional amine is present so as to reduce functionality and avoid gelation. As will be appreciated by one of ordinary skill in the art, the above discussed equivalent ratios relate amine groups to epoxy groups. These ratios would be different if, for example, NH groups rather than amine groups were used as a basis for the ratio. For example, the ratio of amine groups to epoxy groups of 1.01–2:1 discussed above would be equivalent to a ratio of NH groups to epoxy groups of 2.02–4:1.

The reaction product can be dispersed in aqueous medium upon at least partial neutralization with acid. Suitable acids include organic acids such as formic acid, lactic acid and acetic acid, and inorganic acids such as sulfamic acid. The extent of neutralization depends upon the particular reaction product and preferably only sufficient acid is added to solubilize or disperse the reaction product. Preferably, the reaction product is neutralized to an extent of at least 30 percent of the total theoretical neutralization.

The substantially ungelled reaction products of the invention, when at least partially neutralized with acid, are characterized as being non-gelled and dispersible in aqueous medium. The term "dispersion" as used within the context of the present invention means a two-phase transparent, translucent or opaque aqueous resinous system in which the reaction product or resin is the dispersed phase and water the continuous phase. Preferably, the ungelled reaction product is predispersed in water with the neutralizing acid to a percent solids of about 15 to about 50 weight percent, preferably about 25 to about 40 weight percent, of the reaction product in water with the acid.

Preferred compositions of the invention comprise a percentage by weight of the reaction product within the range from about 0.1% to about 80% on a basis of total resin solids, preferably about 2 to about 30 weight percent, and more preferably about 3 to about 15 weight percent. The concentration of the resinous phase in aqueous medium depends upon the particular end use of the dispersion and is generally not critical. The reaction products of the invention can be dispersed in a carrier, such as water and/or solvent. The aqueous medium and the dispersion can contain from at least about 0.01, and usually from about 0.01 to about 20 percent by weight of the reaction product of the invention based on total weight of the aqueous composition.

The ungelled reaction product of the invention can be used in cationic electrodepositable coating compositions or in other coating compositions as discussed above.

The electrodepositable composition preferably further comprises one or more cationic crosslinkable or self-crosslinking film-forming materials or resins such as epoxy resins, polyester resins different from the reaction product described above, polyurethane resins, acrylic resins, copolymers and mixtures thereof in an amount of about 20 to about 99.9 weight percent.

Suitable epoxy functional resins for use as film-forming resins include epoxy functional materials discussed above which are different from the epoxy functional polyester, for example, those disclosed in U.S. application Ser. No. 09/309,850 and U.S. Pat. No. 5,820,987, herein incorporated by reference.

Examples of suitable polyester film forming resins are disclosed, for example, in U.S. Pat. Nos. 5,739,213 and 5,811,198 and the concurrently filed application entitled "Cationic Aliphatic Polyester Resins and Their Use in Electrodeposition", herein incorporated by reference. The polyester film-forming resins have different chemical structures than the epoxy polyester reaction product discussed above. An exemplary polyester film-forming material comprises the reaction product of an aromatic and/or cycloaliphatic carboxylic acid compound comprising at least two aromatic and/or secondary aliphatic carboxyl groups, or an anhydride thereof; a branched aliphatic, cycloaliphatic or araliphatic compound containing at least two aliphatic hydroxyl groups, the aliphatic hydroxyl groups being either secondary or tertiary hydroxyl groups or primary hydroxyl groups attached to a carbon adjacent to a tertiary or quaternary carbon; a compound comprising an ionic salt group or a group which is converted to an ionic salt group; and optionally, at least one hydroxyl substituted carboxylic compound comprising at least one tertiary aliphatic carboxyl group and at least two aliphatic hydroxyl groups. Preferably, the ionic salt group equivalent weight of the polyester polymer is between 1,000 and 10,000.

Useful polyurethane resins include the reaction products of polymeric polyols, such as polyester polyols or acrylic polyols, with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

Suitable acrylic-functional resins include polymers derived from alkyl esters of acrylic acid and methacrylic acid such as are disclosed, for example, in U.S. Pat. Nos. 3,455,806 and 3,928,157, which are incorporated herein by reference.

The coating composition of the invention preferably further comprises one or more curing or crosslinking agents for curing curable groups of the ungelled reaction product and/or the film-forming material. Suitable crosslinking agents include aminoplast resins, blocked or unblocked polyisocyanates, and mixtures thereof. For electrodepositable coating compositions, blocked polyisocyanates are preferred. Instead of a separate curing agent, the film-forming resin may be self-crosslinkable, i.e., may include crosslinkable components as part of the resin.

Useful curing agents include blocked or unblocked polyisocyanates, including aromatic diisocyanates such as p-phenylene diisocyanate, 4,4'-diphenylmethane diisocyanate and 2,4- or 2,6-toluene diisocyanate; aliphatic diisocyanates such as 1,4-tetramethylene diisocyanate and 1,6-hexamethylene diisocyanate; and cycloaliphatic diisocyanates such as isophorone diisocyanate and 4,4'-methylene-bis(cyclohexyl isocyanate). Examples of suitable blocking agents for the polyisocyanates include amines such as dibutyl amine, lower aliphatic alcohols such as methanol, oximes such as methyl ethyl ketoxime amines and lactams such as caprolactam. The amount of the curing agent in the electrodepositable coating composition can range from about 5 to about 50 weight percent on a basis of total resin solids weight of the electrodepositable coating composition.

Other useful aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, such as diazines, triazoles, guanidines, guanamines and alkyl and aryl-substituted derivatives of such compounds.

The electrodepositable coating composition of the invention also can comprise one or more pigments which can be incorporated in the form of a paste, surfactants, wetting agents, catalysts, film build additives, flatting agents, defoamers, flow control agents, pH control additives and carrier materials such as water and/or organic solvents. Useful pigments and fillers for the practice of the invention include iron oxides, lead oxides, carbon black, titanium dioxide, clay and talc.

The electrodepositable coating composition of the invention can be used to form a single layer or as one or more of multiple layers of coatings upon the substrate, which can be pretreated as described below. In a preferred embodiment, the reaction product can be present in an electrodepositable coating composition as the second coat of a two-coat electrodeposited coating. The first coat of such a two-coat system preferably comprises an electrically conductive coating material comprising a curable film-forming resin as discussed above, a curing agent and an electrically conductive pigment.

The first coat is formed by electrodepositing the electrically conductive coating material onto the surface of an electrically conductive substrate. The first coating composition is preferably a cationic electrodepositable composition but can be an anionic composition. Preferred anionic and cationic electrodepositable compositions are those which provide high throwpower and good corrosion resistance. Suitable first coating compositions are well known in the art and are disclosed, for example, in U.S. patent application Ser. No. 09/309,851, herein incorporated by reference.

Examples of ionic resins suitable for use in such cationic electrodepositable coating compositions include amine salt group-containing resins such as the acid-solubilized reaction products of polyepoxides and primary or secondary amines which can be used in combination with a partially or fully blocked isocyanate curing agent. Other useful ionic resins and components of electrodepositable coating compositions are described in U.S. patent application Ser. No. 09/309,851.

The electrodepositable compositions for the first coat contain an electroconductive pigment to make the resultant coating electroconductive. Suitable electroconductive pigments include electrically conductive carbon black pigments, such as described in U.S. application Ser. No. 09/309,851.

The method of applying the first coating composition makes use of the electrodepositable compositions described above and depends upon the electrical conductivity of the substrate material. Most electroconductive substrates, especially metal substrates such as steel, zinc, aluminum, copper, magnesium, or the like and galvanized metals can be coated with the electrodepositable compositions. In a currently preferred practice, the substrate is steel or galvanized steel. Prior to treatment according to the method of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate.

In a preferred method of applying the electrically conductive first coat, the aqueous dispersion of the first electrodepositable composition is placed in contact with an electrically conductive anode and cathode. Upon passage of an electric current between the anode and cathode, an adherent film of the electrodepositable composition will deposit in a substantially continuous manner on either the anode or the cathode depending on whether the composition is anionically or cationically electrodepositable. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter)

After electrodeposition, the first coat is at least partially cured, typically by heating in air. Temperatures usually range from 200° F. to 400° F. (93.3° C. to 204.4° C.), preferably from 300° F. to 375° F. (149° C. to 191° C.) for a period of time ranging from 10 to 60 minutes. The thickness of the resultant film is usually from about 10 to 50 microns.

The heating or baking of the electrodeposited first coat can also be performed by means of infrared radiation ("IR"). Curing can be done in a selected manner, such as described in U.S. application Ser. No. 09/309,851.

After application of the first electroconductive coating, the second coating composition preferably is electrodeposited over the first coat. The second coating composition comprises the reaction product of an epoxy functional polyester and an amine, preferably a polyoxyalkylene polyamine, as described above, a curing agent and optionally pigment, etc. as described above. The second electodeposited coating can be cured in a similar manner to that described above for the first coating composition. In a currently preferred practice, the preferred film former is a self-curing polyurethane as set forth in Table I below.

The combination of coatings not only provides corrosion resistance, but can provide enhanced chip and humidity resistance. The first electrodeposited coat can provide corrosion resistance and the second electrodeposited coat can enhance chip resistance and humidity resistance as well as the workability of the system.

In an alternative embodiment, the epoxy polyester/amine reaction product can be used in primers, basecoats, clearcoats or refinish coatings in like amounts and with similar other film-forming resins and additives as discussed above. Such waterborne, solventborne or powder coating compositions can be spray applied using conventional spray apparatus in a manner well known to those skilled in the art.

Illustrating the invention are the following examples which, however, are not to be considered as limiting the invention to their details. All parts and percentages in the following examples as well as throughout the specification are by weight unless otherwise indicated.

EXAMPLE

This example shows the preparation of a two coat cationically electrodeposited coating according to the present invention applied to an electroconductive substrate.

In this example, the epoxy polyesters referred to as Epoxy Polyester 1 and Epoxy Polyester 2 have the approximate formulas I and II, respectively, discussed above. For Epoxy Polyester 2, in the formula II, R' is an ethyl group and R" is a butyl group.

Steel panels coated with a zinc-iron galvanizing layer, commonly referred to as electrozinc-iron, were pretreated by cleaning and phosphating with CHEMFOS C-700 phosphate and CHEMSEAL CS59 sealer available from PPG Industries Inc., of Pittsburgh, Pa. The resulting panels, supplied as part number APR-27777 by ACT Laboratories, Inc. of Hillsdale, Mich., were electrocoated with ED7151 electrodepositable conductive primer or first coating composition, commercially available from PPG Industries, Inc. of Pittsburgh, Pa. The panels were coated at 170 volts at 95° F. (35° C.) for 120 seconds, spray rinsed with deionized water, and baked for 30 minutes at 375° F. (190.6° C.) in a gas oven. A dry film thickness of 0.7 to 0.8 mils (17.8 to 20.3 microns) resulted.

Preparation of Second Electrodepositable Coating Compositions

A. Preparation of Aqueous Polyurethane Dispersion

Throughout the following discussion, the numbers in parentheses refer to the components described in the Table immediately following the discussion.

Dibutyltin dilaurate, isophorone diisocyanate and methyl isobutyl ketone were combined as charge (1) in a round bottom four neck flask. Trimethylol propane (2) was then added and the temperature was allowed to increase to 90° C., where it was held for 15 minutes. TERATHANE 650 polytetrahydrofuran (3) was then added over 15 minutes while the temperature was maintained at 85–90° C. After a methyl isobutyl ketone rinse, the temperature was maintained for 15 minutes. The reaction mixture was then charged with caprolactam (4) and, after another methyl isobutyl ketone rinse, held at 85–90° C. until the isocyanate equivalent weight of the mixture was greater than 1325. The reaction mixture was then cooled below 75° C. and Jeffamine D-2000 polyoxypropylene diamine (5) was added. After 15 minutes, N-(3-aminopropyl) diethanolamine (6) was added and, after a methyl isobutyl ketone rinse, the reaction mixture was held at 80° C. until the infrared spectrum of the mixture indicated no residual isocyanate. TINUVIN 123 hindered amine light stabilizer (7), TINUVIN 900 UV absorber (8) and methyl isobutyl ketone (9) were then premixed and added to the reaction mixture and mixed for 15 minutes. A portion of the reaction mixture was solubilized by pouring the portion indicated in Table I into a mixture of dimethylpropionic acid (10) and deionized water, and mixing for 30 minutes. Aliquots of deionized water (11), (12) and (13) were added sequentially to the resulting mixture; 15 minutes of mixing followed the addition of each aliquot. The resulting aqueous dispersion was then vacuum stripped to remove solvent. The solids content was then adjusted to 34.5%.

TABLE I

| Charge | Compound | Weight (grams) |
| --- | --- | --- |
| 1 | Dibutyltin dilaurate | 0.78 |
|   | Isophorone diisocyanate | 1665.0 |
|   | Methyl isobutyl ketone | 510.3 |
| 2 | Trimethylol propane | 232.0 |
| 3 | TERATHANE 650[1] | 1016.1 |
| Rinse | Methyl isobutyl ketone | 150.8 |
| 4 | Caprolactam | 402.4 |
| Rinse | Methyl isobutyl ketone | 150.8 |
| 5 | Jeffamine D-2000[2] | 631.5 |
| 6 | N-(3-Aminopropyl) diethanolamine | 294.5 |
| Rinse | Methyl isobutyl ketone | 150.8 |
| 7 | TINUVIN 123[3] | 5.3 |
| 8 | TINUVIN 900[4] | 5.3 |
| 9 | Methyl isobutyl ketone Solubilization | 9.7 |
|   | Weight of resin to be solubilized | 4000.0 |
| 10 | Dimethylpropionic acid | 105.4 |
|   | Deionized water | 2005.6 |
| 11 | Deionized water | 611.1 |
| 12 | Deionized water | 1680.5 |
| 13 | Deionized water | 1200.4 |

[1]TERATHANE 650 polytetrahydrofuran is commercially available from E.I. DuPont de Nemours, Inc.
[2]Jeffamine D-2000 polyoxypropylene diamine is commercially available from the Huntsman Corporation.
[3]TINUVIN 123 hindered amine light stabilizer is commercially available from the Ciba Geigy Corporation.
[4]TINUVIN 900 UV absorber is commercially available from the Ciba Geigy Corporation.

B. Preparation of Curing Agent

A mixture of dibutyltin dilaurate, Desmodur N 3300 polyisocyanate and methyl isobutyl ketone as charge (1) was charged to a 5-liter four neck flask and mixed well. Dibutyl amine (2) was added over the course of approximately 1 hour. The temperature of the reaction mixture was allowed to rise to a maximum of 100° C. The temperature was held at 100° C. until the infrared spectrum of the mixture indicated no residual isocyanate. Then, methyl isobutyl ketone (3) was added.

TABLE II

|   | Material | Weight |
| --- | --- | --- |
| 1 | Dibutyltin dilaurate | 1.45 |
|   | Desmodur N 3300[1] | 582.00 |
|   | Methyl isobutyl ketone | 107.75 |
| 2 | Dibutylamine | 387.75 |
| 3 | Methyl isobutyl ketone | 214.05 |
|   | Total | 1293.00 |

[1]Desmodur N3300 is an aliphatic polyisocyanate available from Bayer Corporation.

Preparation of Epoxy Polyester/Amine Reaction Product of the Invention (Product A)

Epoxy Polyester 1 (1), i.e. a 100% solids epoxy polyester material principally comprising an epoxy polyester of formula I above, where n is about 1 to about 5, and Dowanol PM (2) were charged to a three liter, four neck round bottom flask and warmed to approximately 50° C. with agitation to produce a solution. Heating was then discontinued and Jeffamine D-72000 polyoxypropylene diamine (3) was added quickly. The reaction mixture was then heated or allowed to rise in temperature to 130° C. and held at that temperature for 4 hours. A portion of the reaction product indicated in Table III was poured into a mixture of lactic acid and water (4) and mixed for 30 minutes. The resulting reaction mixture was then diluted with deionized water (5) and mixed well. The final product had a measured solids content of 29.56%.

TABLE III

| | Material | Weight |
|---|---|---|
| 1 | Epoxy polyester 1 | 325.60 |
| 2 | Dowanol PM[1] | 108.53 |
| 3 | Jeffamine D2000[2] | 948.48 |
| | TOTAL Solubilization | 1382.61 |
| | Weight of above to be solubilized | 1175.22 |
| 4 | 88% Lactic acid[3] | 41.78 |
| | Deionized water | 1189.60 |
| 5 | Deionized water | 1325.85 |
| | TOTAL | 3732.45 |

[1]Dowanol PM methoxy propanol solvent is commercially available from Dow Chemical Co.
[2]Jeffamine D-2000 polyoxypropylene diamine is commercially available from the Huntsman Corporation, used neat.
[3]88% lactic acid in water commercially available from Purac.

Preparation of Epoxy Polyester/Amine Reaction Product of the Invention (Product B)

Epoxy Polyester 1 (1) and Dowanol PM (2) were charged to a three liter, four neck round bottom flask and warmed to approximately 50° C. with agitation to produce a solution. Heating was then discontinued and Jeffamine D-2000 (3) was added quickly. The reaction mixture was then heated or allowed to rise in temperature to 130° C. and held at that temperature for 4 hours. The reaction mixture was then cooled to 100° C., and curing agent (4) was added. After 15 minutes of mixing, 88% lactic acid (5) was added. After an additional 15 minutes of mixing, deionized water was added over approximately 1 hour and the reaction mixture was mixed well. The resulting aqueous dispersion was then poured into a 12 liter four neck flask, and heated to 60° C. with agitation. Approximately 360 g of water and solvent were distilled off under vacuum. The remaining reaction mixture was cooled below 50° C. and poured out. The final resin dispersion had a measured solids content of 33.51%. Product B differs from Product A by including the curing agent described above.

TABLE IV

| | Material | Weight |
|---|---|---|
| 1 | Epoxy Polyester 1 | 179.08 |
| 2 | Dowanol PM | 59.69 |
| 3 | Jeffamine D2000 | 525.89 |
| 4 | Curing agent described | 402.84 |
| 5 | 88% lactic acid | 32.44 |
| 6 | Deionized water | 2252.21 |
| | TOTAL | 3452.15 |

Preparation of Epoxy Polyester/Amine Reaction Product of the Invention (Product C)

A sample of Jeffamine D-2000 polyoxypropylene diamine (1) was warmed to 50° C. Epoxy Polyester 2 (2), i.e., an epoxy polyester material (88 weight percent in MIBK) principally comprising an epoxy polyester of formula II discussed above, where n is about 1 to about 5, R' is ethyl, and R" is butyl, was added and the reaction mixture was heated or allowed to increase in temperature to 130° C. and held at this temperature for 5 hours. The reaction mixture was then solubilized by pouring the weight of resin indicated in Table V into a mixture of 88% lactic acid (3) and deionized water (4) with agitation. After 30 minutes of mixing, additional deionized water (5) was added and the resulting reaction mixture was mixed well. The resulting aqueous dispersion was then poured into a 12 liter 4 neck flask and heated to 60° C. with agitation. Approximately 380 g of water and solvent was distilled off under vacuum. The remaining reaction mixture was cooled below 50° C. and poured out. The final aqueous dispersion had a solids content of 33.57%.

TABLE V

| | Raw material | Weight |
|---|---|---|
| 1 | Jeffamine D2000 | 956.16 |
| 2 | Epoxy Polyester 2 | 299.52 |
| | TOTAL Solubilization | 1255.68 |
| | Resin (reaction product of 1 and 2 above) | 1067.33 |
| 3 | 88% lactic acid | 41.78 |
| 4 | Deionized water | 1206.16 |
| 5 | Deionized water | 1280.18 |
| | TOTAL | 3595.45 |

Preparation of Electrodepositable Coating Composition Including Product A (Coating A)

A cationic electrodepositable coating was prepared by adding the components in the order listed in Table VI below to a bath-type container for the coating of panels. The deposition of the composition involved immersing pre-treated and primer coated panels as described above in the bath and individually electrocoating the panels at 250 volts for 120 seconds at 95° F. (35° C.), spray rinsing with deionized water, and curing in an oven in order to produce baked film thickness of about 1.30 mils (33 microns).

TABLE VI

| Material | Parts by Weight |
|---|---|
| Aqueous Polyurethane Dispersion[1] | 1067.3 |
| Product A from above | 94.8 |
| Pigment Paste[2] | 113.4 |
| Deionized Water | 2624.5 |
| Total | 3900 |

[1]As prepared in part A, TABLE I above.
[2]A cationic pigment paste (E8001) commercially available from PPG Industries, Inc., Pittsburgh, Pennsylvania.

Preparation and Application of Electrodepositable Coating Composition Including Product B (Coating B)

A cationic electrodepositable coating was prepared by mixing the blend of components (1), see Table VII, with the blend of components (2) and then adding components (3), (4), and (5) in the order listed in a bath-type container for the coating of panels. The deposition of the composition involved immersing a conductive substrate panel (which was pretreated and had a conductive first electrocoat thereon as described previously) in the bath and individually electrocoating the panels with the second electrodepositable coating at 180 volts for 135 seconds at 90° F. (32.2° C.), spray rinsing with deionized water, and curing in an oven in order to produce baked film thickness of about 1.30 mils (33 microns).

TABLE VII

| | Material | Parts by Weight |
|---|---|---|
| 1 | 88% lactic acid | 0.5 |
| 1 | Deionized Water | 4.5 |
| 2 | Product B | 233.6 |
| 2 | Butyl CELLOSOLVE ®[1] | 9.1 |
| 3 | Aqueous Polyurethane Dispersion as above | 915.5 |
| 4 | Pigment paste | 113.4 |
| 5 | Deionized Water | 2623.4 |
| | Total | 3900.0 |

[1]The monobutyl ether of ethylene glycol, commercially available from Union Carbide Corporation.

Preparation and Application of Control Electrodepositable Coating Composition

A cationic electrodepositable coating was prepared by adding the components in the order listed in Table VIII to a bath-type container for the coating of panels. The deposition of the composition involved immersing individual pretreated and primer electrocoated coated panels as described above in the bath and electrocoating the panels with the control electrodepositable second coating composition at 250 volts for 150 seconds at 95° F. (35° C.), spray rinsing with deionized water, an oven in order to produce baked film thickness mils (33 microns).

TABLE VIII

| Material | Parts by Weight |
|---|---|
| Aqueous polyurethane dispersion | 1147.6 |
| Pigment Paste | 113.4 |
| Deionized water | 2639.0 |
| Total | 3900.0 |

Humidity and Blistering Testing

The panels electrocoated with Coating B and the Control coating were baked for 60 minutes at 385° F. (196.1° C.) in an electric fired oven. After cooling, the panels were topcoated with HWBS737389/DCT5002H, a red waterborne basecoat/solventborne clearcoat system commercially available from PPG Industries, Inc., of Pittsburgh, Pa. The topcoat comprised a basecoat of about 1.0 mil (25.6 microns) and a clearcoat of 2.2 mils (56.4 microns).

The topcoated sides of the test panels were evaluated for cross-hatch resistance in accordance with ASTM D 3359 both before ("Before" in Table IX) and after ("After" in Table IX) humidity treatment for 72 hours at 140° F. (60° C.) in accordance with ASTM D 4585. Cross-hatch resistance testing was carried out in accordance with ASTM 3359 Method B using a 1 mm crosshatch blade available from Paul N. Gardner Company, Inc., Pompano Beach, Fla. The panels were tested for blistering in accordance with ASTM D 714 after the humidity treatment. Table IX summarizes the results of the cross-hatch and blistering tests. The test results discussed below were for a single coated panel.

The listed cross-hatch resistance values are on a 0 to 10 scale, with 10 indicating no failure, 5 indicating a 50% topcoat adhesion loss, and 0 indicating a complete topcoat loss. The listed blistering values are on a 1 to 10 scale, with 10 indicating no blisters, 6 indicating slight blistering, and 1 indicating heavy blistering. The numbers in parenthesis for the cross-hatch results and blistering results are reported in accordance with the format set forth in ASTM 3359 and ASTM 714, respectively.

TABLE IX

| | Coating B | Control |
|---|---|---|
| Cross-hatch results (Before) | 10 (5B8) | 10 (5B8) |
| Cross-hatch results (After) | 9 (4B8) | 2 (0B) |
| Blistering | 6 (few/medium 8) | 1 (dense 6) |

The test results in Table IX indicate that the panel coated with electrocoating composition containing an epoxy polyester/amine reaction product according to the invention (Coating B) has greater humidity resistance as measured by face blistering and topcoat adhesion when compared to a similar panel coated with an electrodeposited coating without the reaction product (Control).

Chip and Impact Resistance Testing

Pretreated and primed test panels were electrocoated with Coating B or the control coating described above. The panels were baked under different conditions as set forth in Table X. After cooling, the panels were topcoated with HWBS7373879/DCT5002H, a red waterborne basecoat/solventborne clearcoat system commercially available from PPG Industries, Inc., of Pittsburgh, Pa. The topcoat had a basecoat of about 1.0 mil (25.6 microns) and a clearcoat of about 2.2 mils (56.4 microns).

The topcoated sides of the test panels were evaluated for chip and impact resistance by measuring the damage caused by single projectiles impacting the surface at high velocities in accordance with a conventional Kugelstoss testing method. In accordance with the Kugelstoss testing method, the topcoated panels were stored in a freezer at −20° C. for at least two hours, and then shot while in the freezer with a 2 mm chrome steel ball at a velocity of 155 miles per hour (249 km/hour). The ball impacted the coated test panel at an angle of 90°, or perpendicular to the surface. Raised and loosened portions of the coating were then removed with a sharp tool. The total area of damage was measured and the results reported in Table X in square millimeters of damage. For impact testing with 3 mm balls, the same method was used as with the Kugelstoss test, except that 3 mm chrome steel balls were shot at 75 miles per hour (121 km/hr.), 95 miles per hour (153 km/hr.), and 155 miles per hour (249 km/hr.). The results of this testing are contained in Table X.

TABLE X

| Formulation | Cure | Oven | Kugel-stoss | 3 mm ball 75 mph | 3 mm ball 95 mph | 3 mm ball 155 mph | Total of All Impacts |
|---|---|---|---|---|---|---|---|
| Coating B | 30 min 320° F. (160° C.) | Gas | 2.5 | 2.3 | 2.5 | 4.0 | 11.2 |
| Coating B | 30 min 320° F. (160° C.) | Electric | 2.3 | 1.8 | 4.2 | 4.0 | 12.3 |
| Coating B | 30 min 350° F. (177° C.) | Gas | 3.1 | 2.0 | 2.8 | 5.0 | 12.5 |
| Coating B | 30 min 350° F. (177° C.) | Electric | 2.3 | 1.8 | 2.5 | 4.0 | 10.4 |
| Coating B | 60 min 385° F. (177° C.) | Gas | 2.8 | 2.3 | 2.8 | 5.0 | 12.5 |
| Coating B | 60 min 385° F. (177° C.) | Electric | 2.8 | 2.3 | 2.8 | 5.0 | 12.4 |
| Coating B | Total of All Bakes | | 15.8 | 12.5 | 17.6 | 27.0 | 71.3 |
| Control | 30 min 320° F. (160° C.) | Gas | 7.1 | 3.1 | 4.5 | 5.0 | 19.6 |
| Control | 30 min 320° F. (160° C.) | Electric | 13.0 | 17.0 | 18.0 | 24.0 | 71.0 |
| Control | 30 min 350° F. (177° C.) | Gas | 2.5 | 2.3 | 2.5 | 25.0 | 31.9 |
| Control | 30 min 350° F. (177° C.) | Electric | 2.3 | 1.8 | 2.5 | 3.0 | 10.0 |
| Control | 60 min 385° F. (196° C.) | Gas | 16.0 | 3.1 | 3.8 | 5.0 | 27.7 |
| Control | 60 min 385 F. (196° C.) | Electric | 2.8 | 2.5 | 4.2 | 5.0 | 14.1 |
| Control | Total of All Bakes | | 43.7 | 29.8 | 35.5 | 67.0 | 174.3 |

The results in Table X demonstrate that the panels coated with the electrodeposited coating containing the epoxy polyester/amine reaction product of the invention (Coating B) has generally superior chip and impact resistance when compared to the panels coated with the coating without the reaction product (Control).

The above invention has been described with reference to the preferred embodiment. Other modifications and alterations will occur to others upon reading and understanding the preceding detailed description. It is intended that the invention be construed as including all such modifications and alterations insofar as they come within the scope of the appended claims or the equivalents thereof.

Therefore, we claim:

1. A curable coating composition comprising a curing agent and a substantially ungelled reaction product prepared from reactants comprising:

(a) an epoxy functional polyester; and (b) a polyoxyalkylene polyamine, wherein the epoxy functional polyester comprises a polyester having a formula selected from the group consisting of formula I:

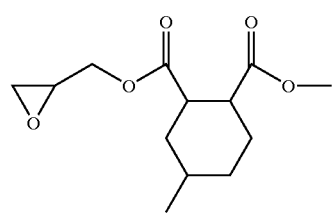

(I)

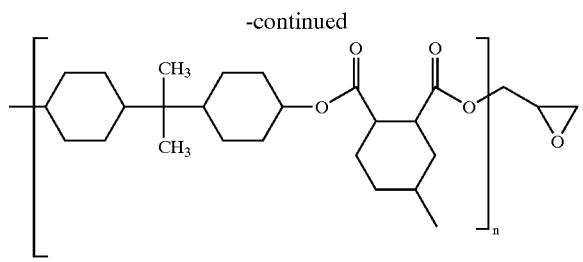

where n is an integer ranging from about 1 to about 15, and formula II:

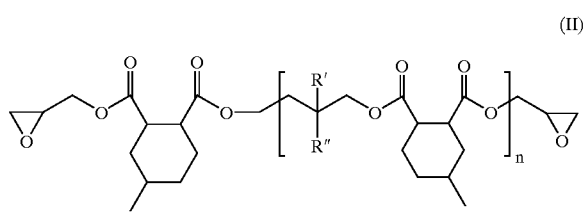

(II)

where R' and R" represent independently selected alkyl groups, and where n is an integer ranging from about 1 to about 15.

2. The curable coating composition of claim 1, wherein the coating composition is an electrodepositable coating composition.

3. The curable coating composition of claim 1, wherein the epoxy functional polyester (a) is essentially free of hydroxyl functionality and is prepared from reactants comprising:

(1) the reaction product of a polyol and a polycarboxylic acid or anhydrides thereof; and (2) an epoxy functional material.

4. The curable coating composition of claim 3, wherein the polyol is saturated bisphenol A.

5. The curable coating composition of claim 3, wherein the anhydride of the polycarboxylic acid is methyl hexahydrophthalic anhydride.

6. The curable coating composition of claim 3, wherein the reaction product (1) is formed prior to reaction with the epoxy functional material (2).

7. The curable coating composition of claim 3, wherein the epoxy functional material (2) is epichlorohydrin.

8. A curable coating composition comprising a curing agent and a substantially ungelled reaction product prepared from reactants comprising:

(a) an epoxy functional polyester; and (b) a polyoxyalkylene polyamine, wherein the epoxy functional polyester (a) is prepared from reactants comprising:

(1) the reaction product of a polyol and a polycarboxylic acid or anhydrides thereof; and (2) an epoxy functional material, and wherein the epoxy functional polyester (a) is represented by the following formula (I):

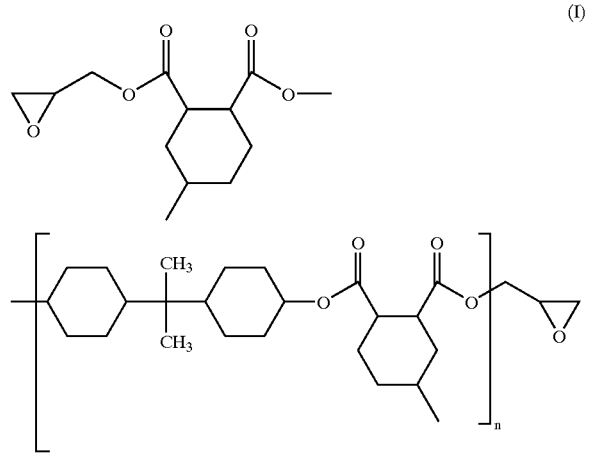

(I)

where n is an integer ranging from about 1 to about 15.

9. A curable coating composition comprising a curing agent and a substantially ungelled reaction product prepared from reactants comprising:

(a) an epoxy functional polyester; and (b) a polyoxyalkylene polyamine, wherein the epoxy functional polyester (a) is prepared from reactants comprising:

(1) the reaction product of a polyol and a polycarboxylic acid or anhydrides thereof; and (2) an epoxy functional material, and wherein the epoxy functional polyester (a) is represented by the following formula II:

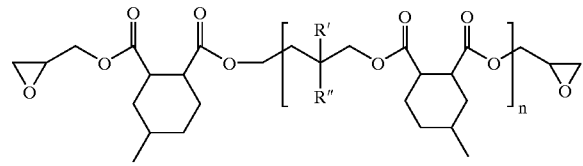

(II)

where R' and R" represent independently selected alkyl groups, and where n is an integer ranging from about 1 to about 15.

10. The curable coating composition of claim 9, wherein R' and R" are independently selected from the group consisting of methyl, ethyl, propyl and butyl groups.

11. The curable coating composition of claim 10, wherein R' is an ethyl group and R" is a butyl group.

12. The curable coating composition of claim 1, wherein the polyoxyalkylene polyamine is a diamine.

13. The curable coating composition of claim 1, wherein the polyoxyalkylene polyamine is a primary amine.

14. The curable coating composition of claim 1, wherein the polyoxyalkylene polyamine is represented by the formula:

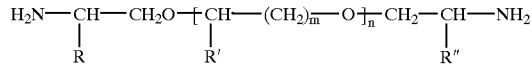

where R, R' and R" are selected from the group consisting of hydrogen and alkyl-groups having about 1 to about 6 carbon atoms, where m is a number ranging from 0 to about 6, and where n is a number ranging from about 4 to about 40.

15. The curable coating composition of claim 1, wherein a ratio of the amine groups of the polyoxyalkylene polyamine to epoxy functional groups of the functional polyester ranges from about 1.01:1 to about 2:1.

16. The curable coating composition of claim 15, wherein the ratio is about 1.2:1.

17. The curable coating of claim 1, wherein the epoxy functional polyester (a) is essentially free of hydroxyl functionality.

18. The curable coating composition of claim 1, wherein the percentage by weight of the reaction product ranges from about 0.1% to about 80% on a basis of total resin solids.

19. The curable coating composition of claim 1, wherein the curing agent is selected from the group consisting of polyisocyanates, blocked isocyanates, aminoplasts, tricarbamoyl triazines and mixtures thereof.

20. The curable coating composition of claim 1, further comprising a carrier material.

* * * * *

UNITED STATES PATENT AND TRADEMARK OFFICE
CERTIFICATE OF CORRECTION

PATENT NO.    : 6,417,292 B1
DATED         : July 9, 2002
INVENTOR(S)   : Moriarity et al.

It is certified that error appears in the above-identified patent and that said Letters Patent is hereby corrected as shown below:

Column 19,
Lines 23-24, delete entire claim.

Column 20,
Lines 1-4, delete entire claim.
Line 14, delete "10", insert -- 9 --.
Line 17, delete "11", insert -- 10 --.
Line 19, delete "12", insert -- 11 --.
Line 21, delete "13", insert -- 12 --.
Line 23, delete "14", insert -- 13 --.
Line 36, delete "15", insert -- 14 --.
Line 40, delete "16", insert -- 15 --.
Line 42, delete "17", insert -- 16 --.
Line 42, delete "1", insert -- 3 --.
Lines 43-44, delete "polyester (a) is essentially free of hydroxyl functionality", and insert -- material (2) is epichlorohydrin --.
Line 45, delete "18", insert -- 17 --.
Line 45, delete "composition".
Lines 46-47, delete "percentage by weight of the reaction product ranges from about 0.1% to about 80% on a basis of total resin solids" insert -- the epoxy functional polyester (a) is essentially free of hydroxyl functionality --.
Line 48, delete "19", insert -- 18 --.
Line 48, delete "composition" and delete "further".
Line 52, delete "20", insert -- 19 --.
Line 53, delete "comprising a carrier material", insert -- wherein the epoxy functional polyester (a) is essentially free of hydroxyl functionality --.

Signed and Sealed this

Twenty-first Day of October, 2003

JAMES E. ROGAN
*Director of the United States Patent and Trademark Office*